US008422215B2

(12) United States Patent
Ou et al.

(10) Patent No.: US 8,422,215 B2
(45) Date of Patent: Apr. 16, 2013

(54) HANDHELD ELECTRONIC DEVICE

(75) Inventors: Tsung-Yuan Ou, Taoyuan County (TW); Chih-Wei Tai, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 317 days.

(21) Appl. No.: 13/014,663

(22) Filed: Jan. 26, 2011

(65) Prior Publication Data

US 2012/0026654 A1 Feb. 2, 2012

(30) Foreign Application Priority Data

Jul. 30, 2010 (TW) ................................ 99125381 A

(51) Int. Cl.
*G06F 1/16* (2006.01)

(52) U.S. Cl.
USPC .............. 361/679.3; 361/679.55; 361/679.56; 312/223.1; 312/223.2; 455/575.1; 455/575.4; 379/433.04

(58) Field of Classification Search ............... 361/679.3; 379/433.04
See application file for complete search history.

(56) References Cited

U.S. PATENT DOCUMENTS

| 7,627,337 | B2 | 12/2009 | Maatta et al. |
| 8,199,487 | B2 * | 6/2012 | Clerc et al. ............... 361/679.55 |
| 2010/0159993 | A1 * | 6/2010 | Davidson et al. ............. 455/566 |

FOREIGN PATENT DOCUMENTS

WO 2010/023354 3/2010

OTHER PUBLICATIONS

"Office Action of Europe Counterpart Application", issued on Feb. 12, 2012, pp. 1-5.

* cited by examiner

*Primary Examiner* — Anthony Q Edwards
(74) *Attorney, Agent, or Firm* — Jianq Chyun IP Office

(57) ABSTRACT

A handheld electronic device includes first, second and third bodies, first and second pivot members pivot to the first body and a gear set. The second body having a pillar is slidably disposed on the first pivot member. The third body having a rack is slidably disposed on the second pivot member, the second body stacked between the first and third bodies. The gear set is disposed on the first body and coupled with the pillar and the rack. When the third body moves relatively to the first body along a first operation direction for driving the second body to move relatively to the first body along a second operation direction opposite to the first operation direction to be exposed by the third body, the first and second pivot members rotate relatively to the first body to drive the second and third bodies to tilt relatively to the first body.

14 Claims, 22 Drawing Sheets

Section A-A

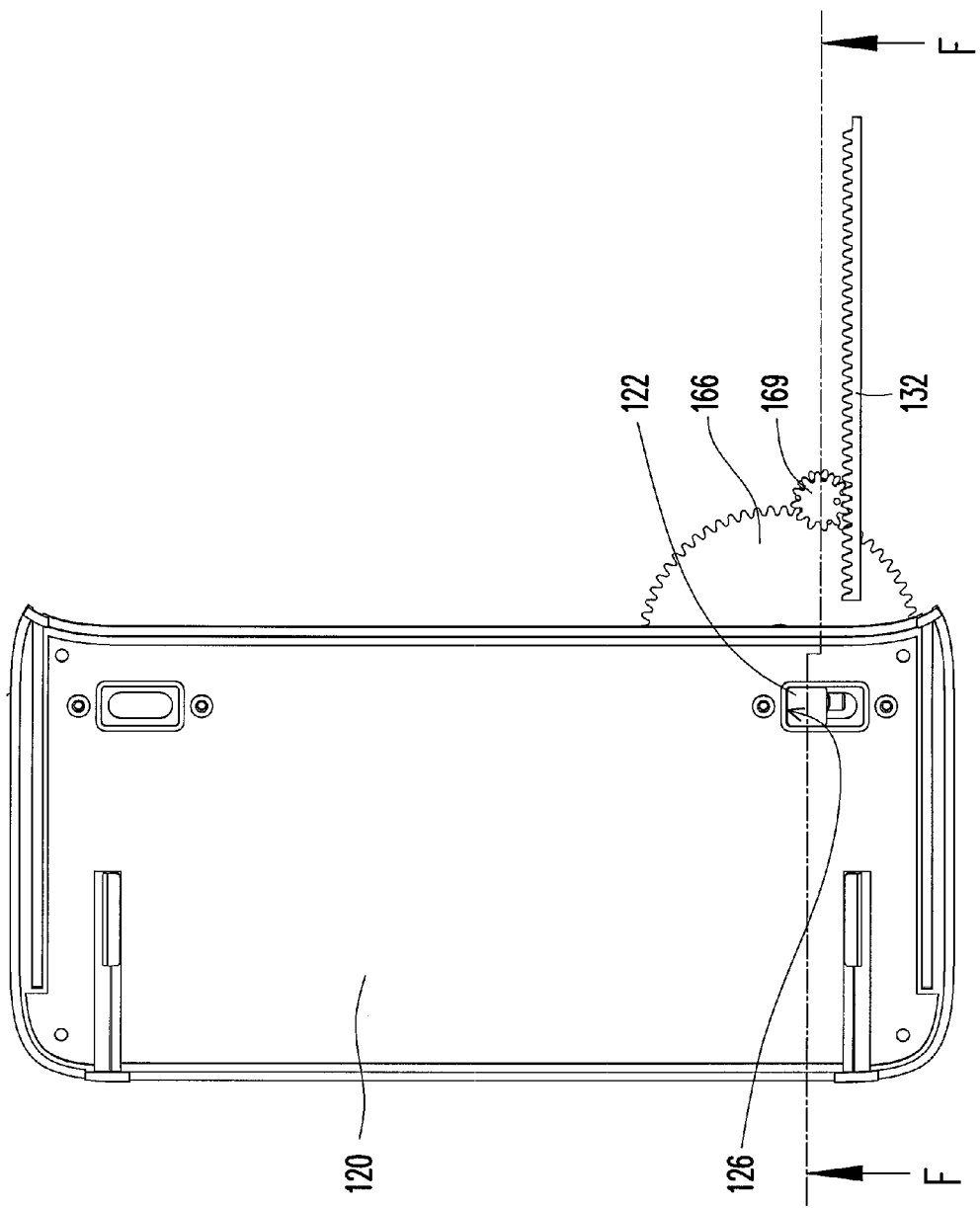

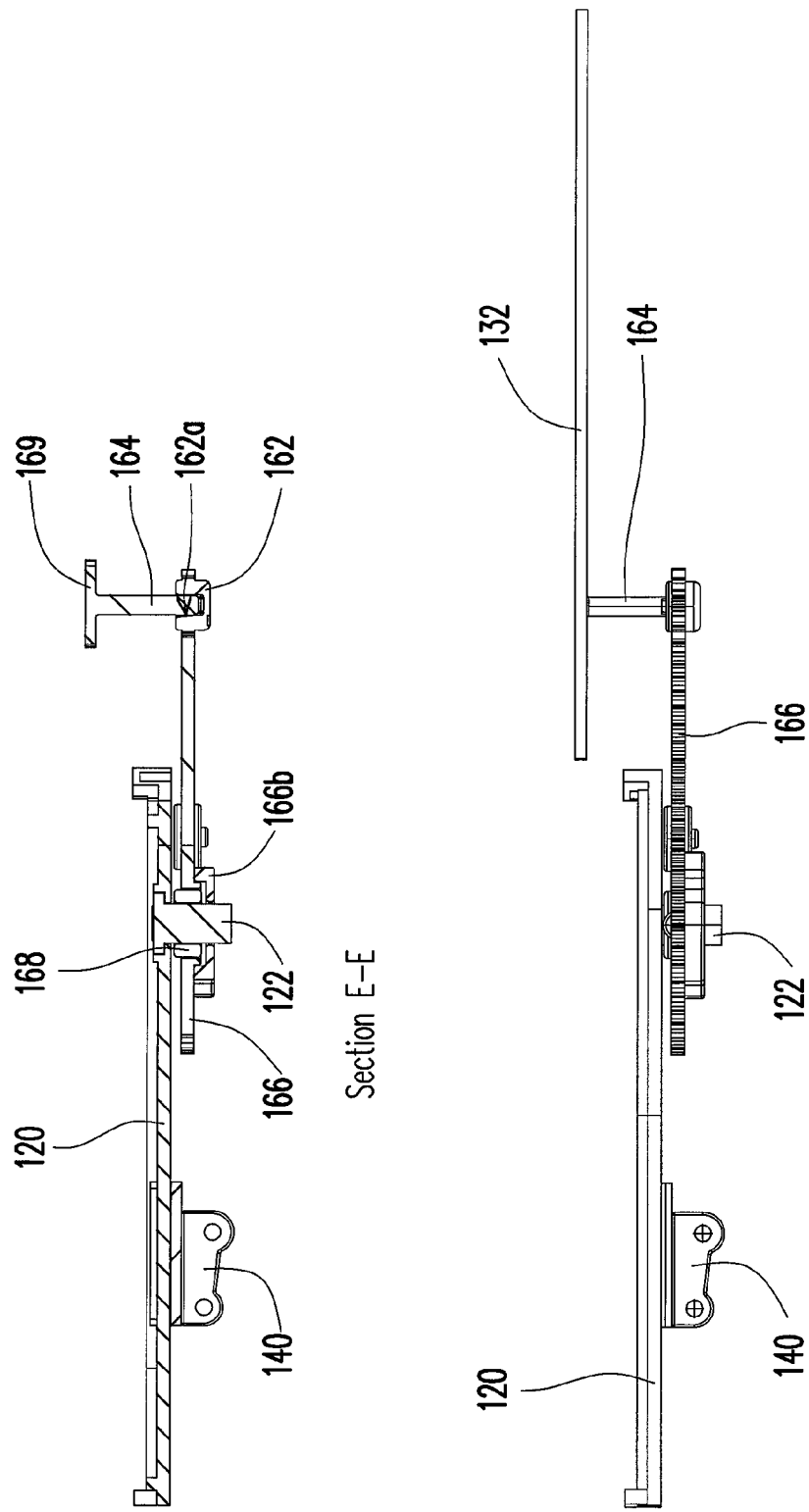

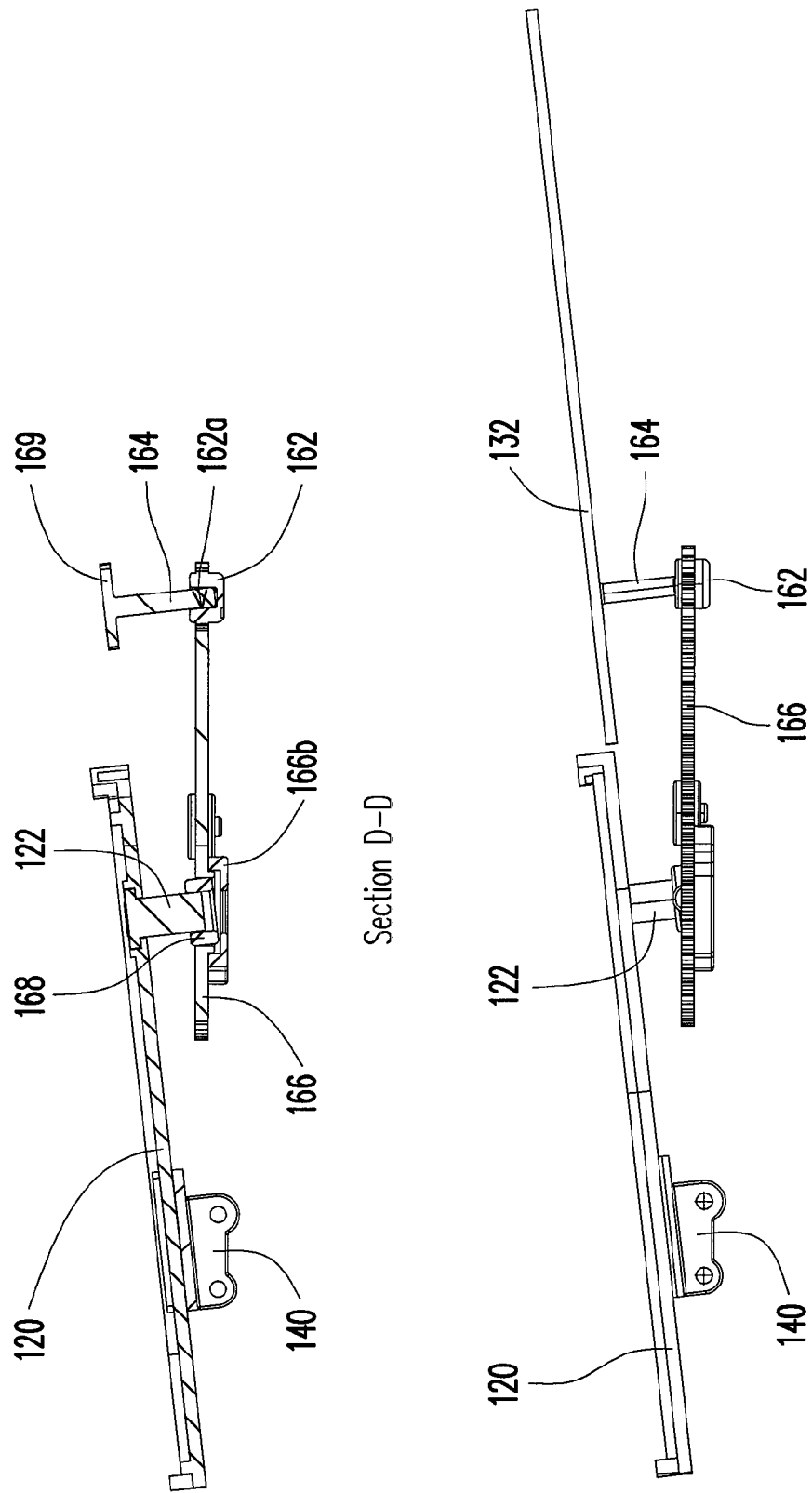

HANDHELD ELECTRONIC DEVICE

CROSS-REFERENCE TO RELATED APPLICATION

This application claims the priority benefit of Taiwan application serial No. 99125381, filed on Jul. 30, 2010. The entirety of the above-mentioned patent application is hereby incorporated by reference herein and made a part of this specification.

BACKGROUND OF THE INVENTION

1. Field of the Invention

The application relates to an electronic device. More particularly, the application relates to a handheld electronic device.

2. Description of Related Art

With the advancement of information technology, it becomes easier and easier to obtain necessary information from daily-used electronic devices. On the other hand, relying on the dramatic improvement of the state of the art, handheld electronic devices are developed to be lighter and slimmer. With the advantage of being portable, handheld electronic devices are popular and broadly used in daily life.

Taking cell phones as an example, various types of cell phones such as bar type, folded type, rotate type, slide type, etc. are proposed to meet different preferences and requirements. In respect to slide type cell phones, two bodies are slidably coupled together to be operated in an expanding mode and a retracting mode. Stacking the two bodies facilitates minimizing dimensions of the slide type cell phone, while the two bodies are expanded in specific operating modes. With the advancement of touch screen technology, cell phone touch screen functions gradually replace conventional key press functions. Thus, the subject of issue is how to have a larger usable surface on a cell phone body that has limited space.

SUMMARY OF THE INVENTION

The application provides a handheld electronic device, comprising a larger usable surface area, so as to increase the flexibility of the arrangement of components.

The application provides a handheld electronic device, including a first body, a first pivot member, a second pivot member, a second body, a third body, and a gear set. The first pivot member pivots to the first body. The second pivot member pivots to the first body. The second body having a pillar is slidably disposed on the first pivot member. The third body having a rack is slidably disposed on the second pivot member. The second body is stacked between the first body and the third body, so the handheld electronic device is in a retracted state. The gear set is disposed on the first body and coupled with the pillar and the rack. When the third body moves relatively to the first body along a first operation direction, and when the rack drives the gear set to actuation. The second body is driven by the gear set via the pillar to move relatively to the first body along a second operation direction opposite to the first operation direction to be exposed by the third body. When the second body is exposed by the third body, the second body utilizes the relative pivoting between first pivot member and the first body to tilt relatively to the first body, and the third body utilizes the relative pivoting between the second pivot member and the first body to tilt relatively to the first body, so the handheld electronic device is in an expanded state.

Accordingly, the second body of the application is stacked between the first and third bodies. The third body utilizes the gear set to drive the second body. This way, the third body and the second body move along opposite directions so that the second body is exposed by the third body. Next, the second body and the third body tilt relatively to the first body, combining the third body and the second body, so that the handheld electronic device has a larger usable surface.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 5A to 5C are schematic views showing part of the components and the operation processes of the handheld electronic device in FIGS. 1A to 1C, respectively.

FIG. 6B is a schematic side view and a schematic cross-sectional view along section E-E of the handheld electronic device in FIG. 5B.

FIG. 6C is a schematic side view and a schematic cross-sectional view along section F-F of the handheld electronic device in FIG. 5C.

DESCRIPTION OF EMBODIMENTS

Figure 1A:
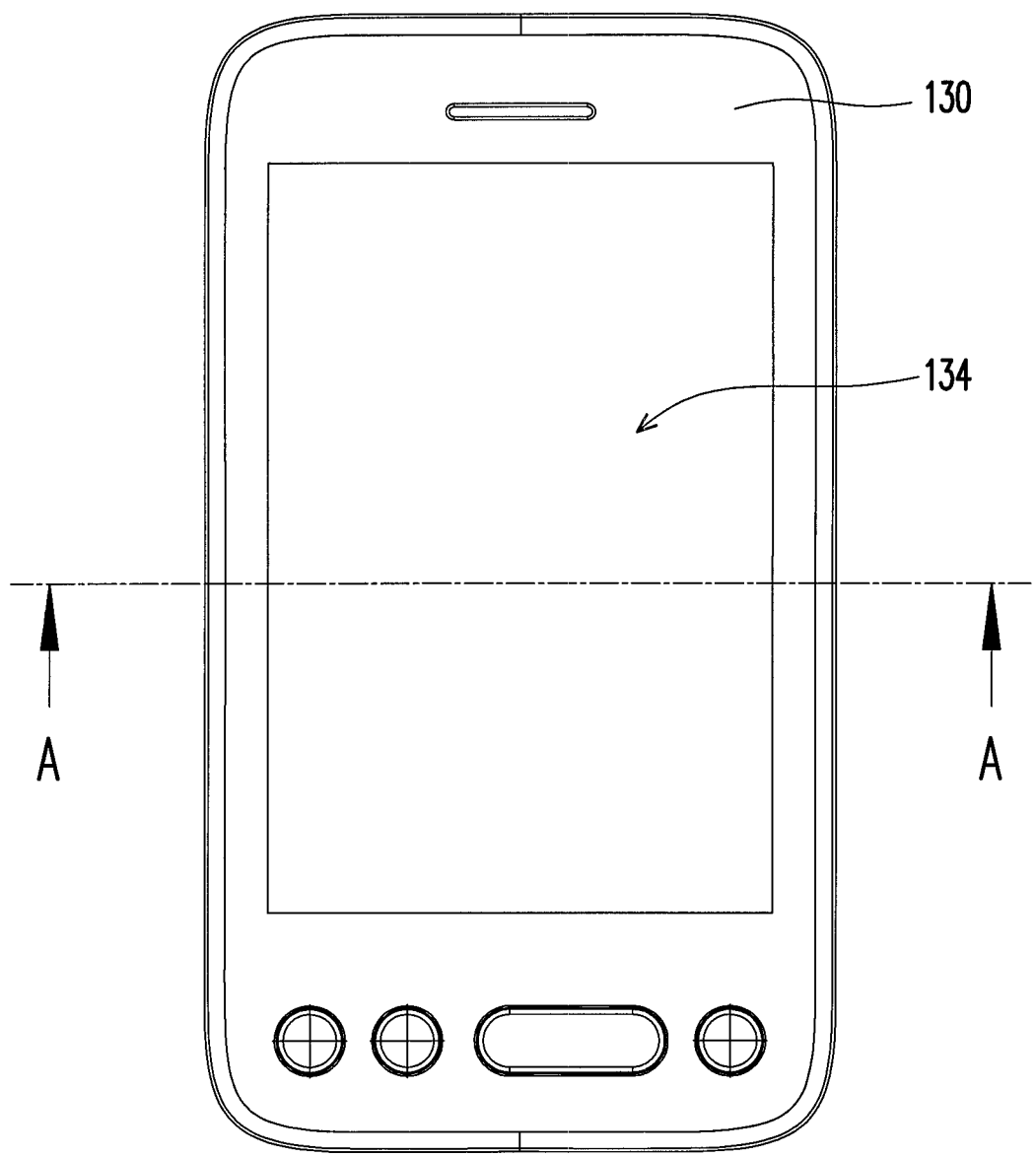
FIGS. 1A through 1C schematically show operation processes of the handheld electronic device according to one embodiment of the invention.
Figure 1B:
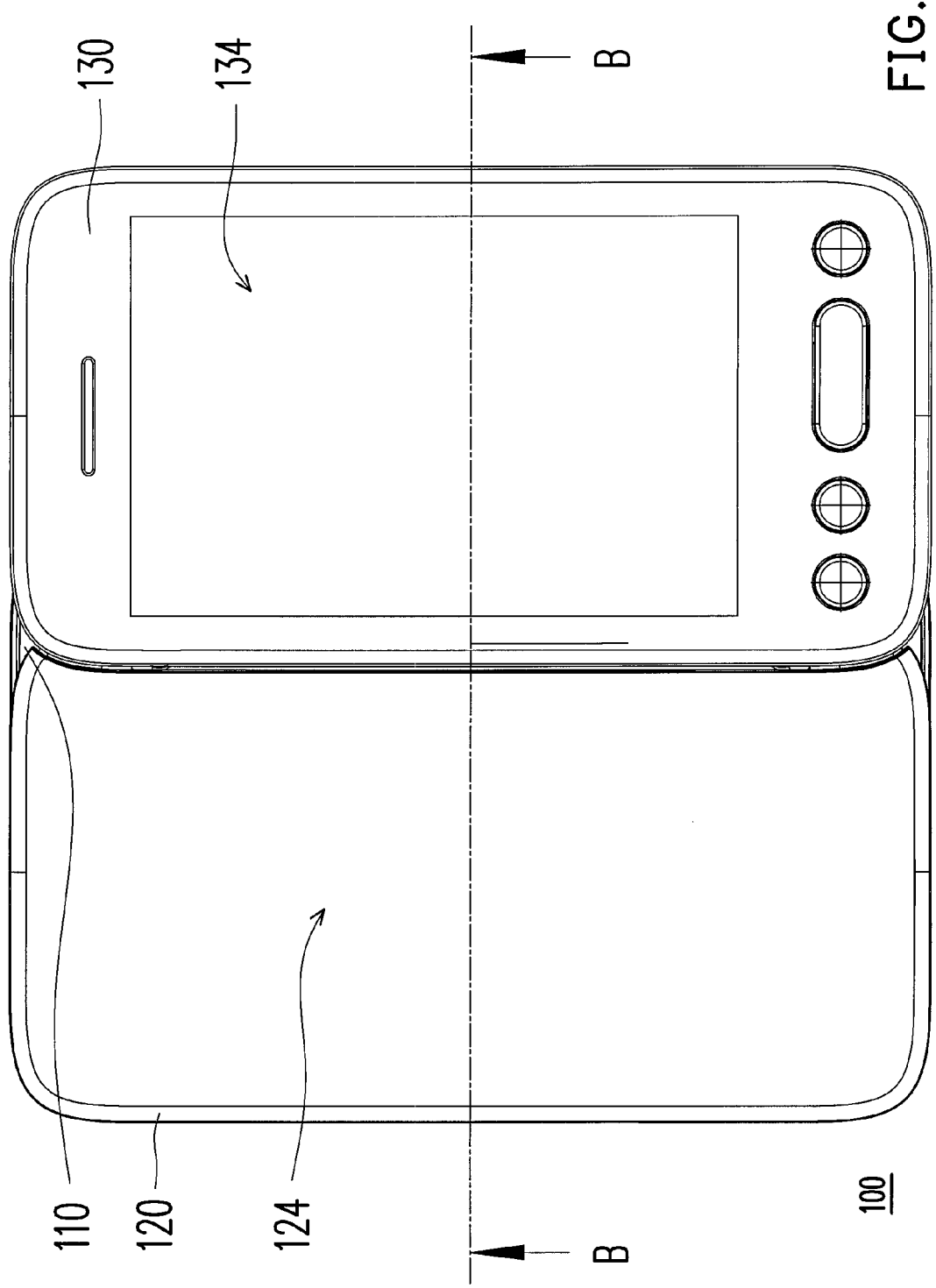
Figure 1C:
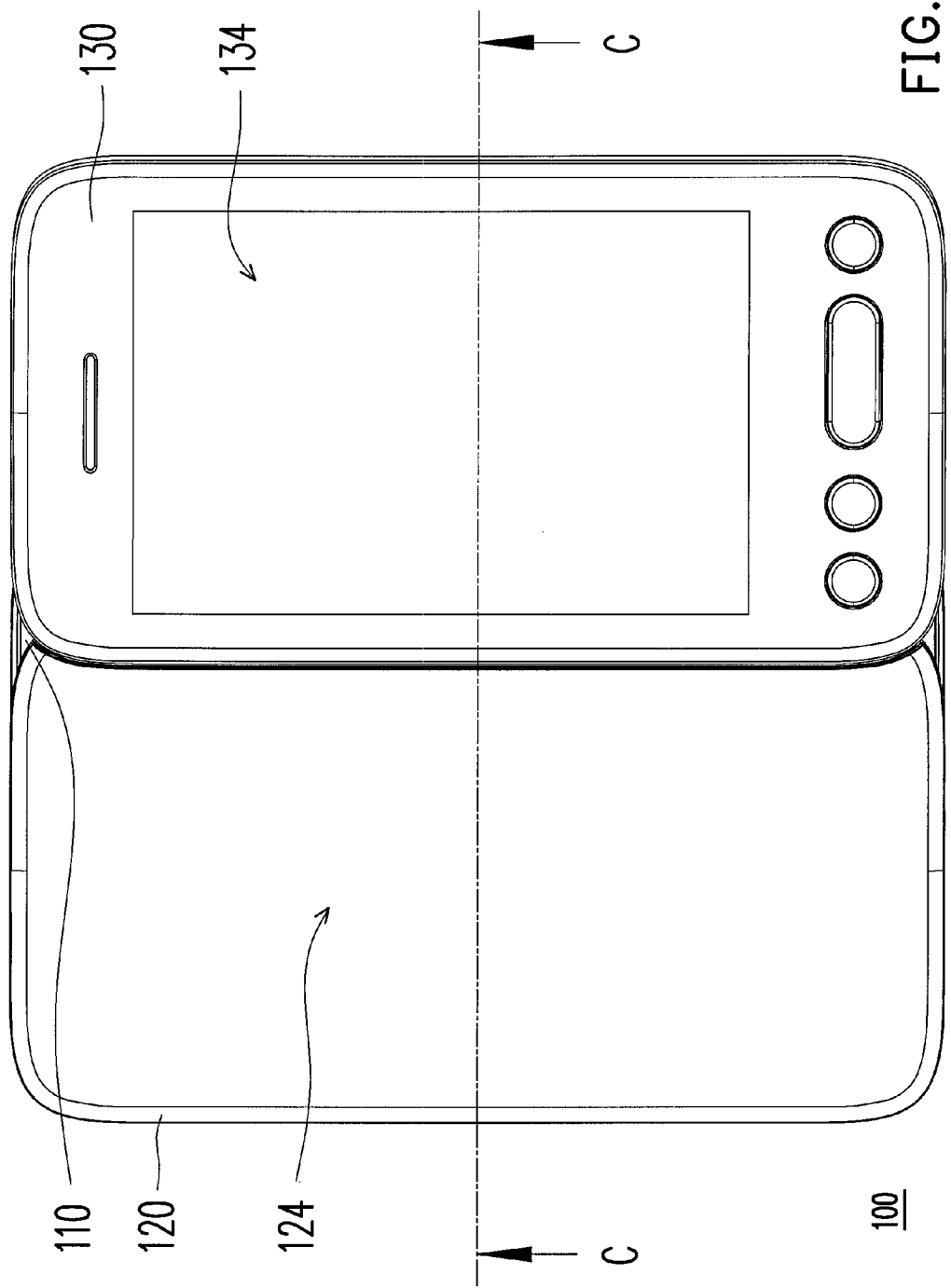
Figure 2A:
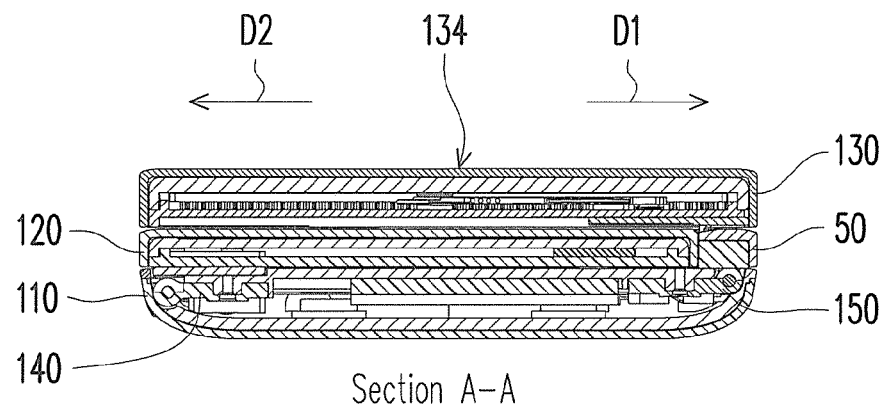
FIG. 2A is a schematic side view and a schematic cross-sectional view along section A-A of the handheld electronic device in FIG. 1A.
Figure 2A:
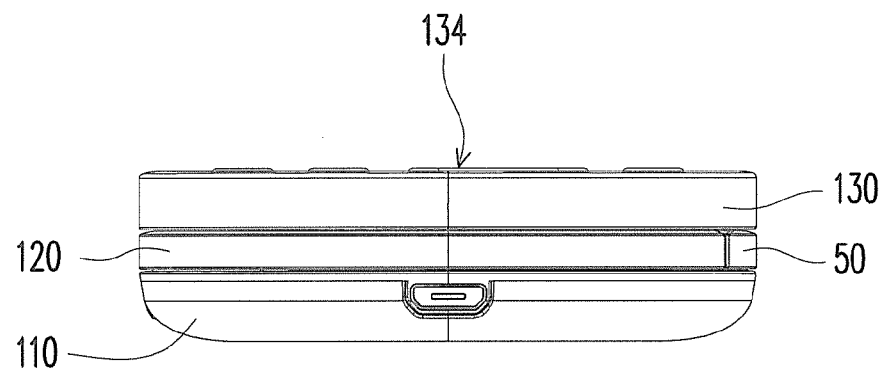
Figure 2B:
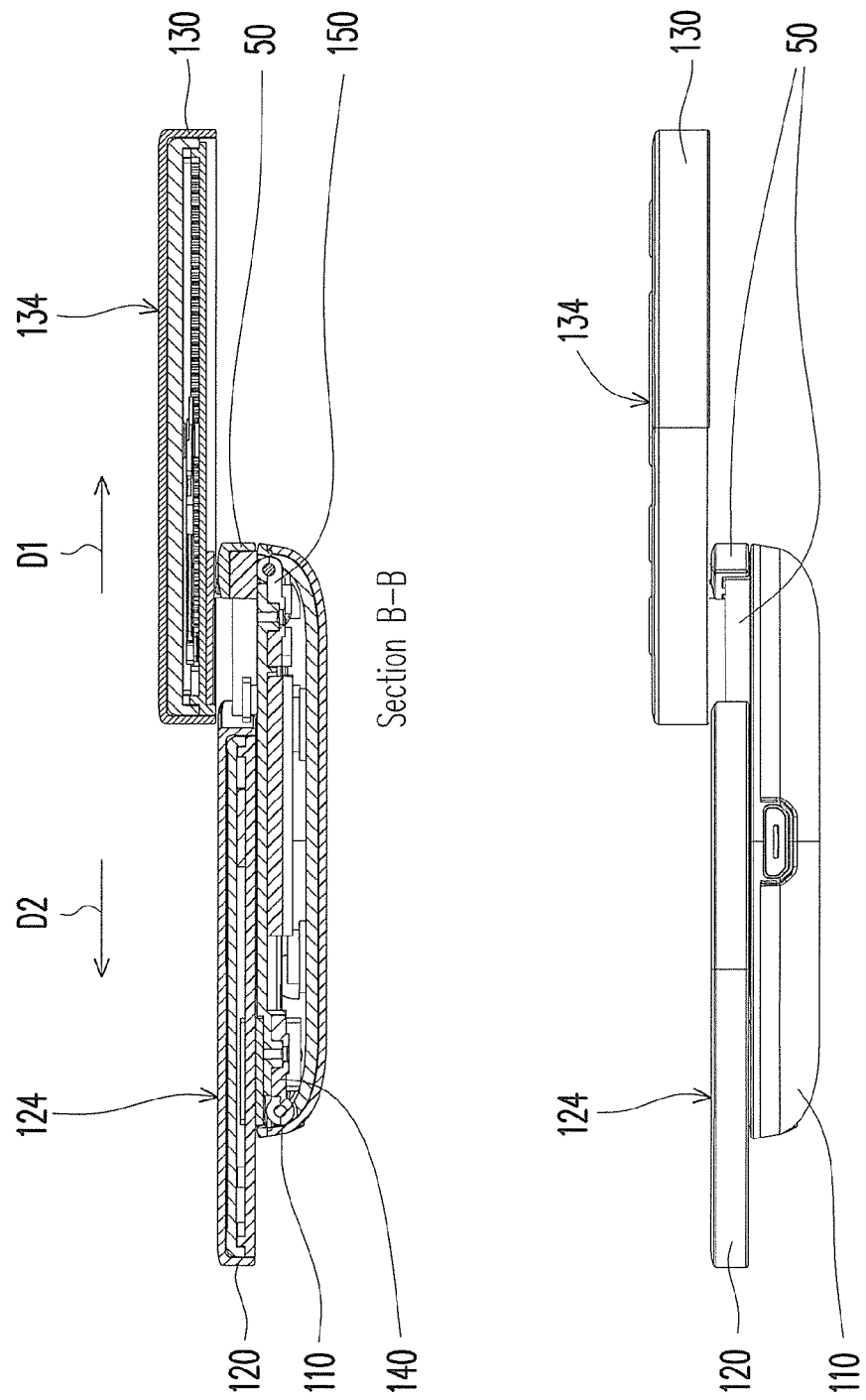
FIG. 2B is a schematic side view and a schematic cross-sectional view along section B-B of the handheld electronic device in FIG. 1B.
Figure 2C:
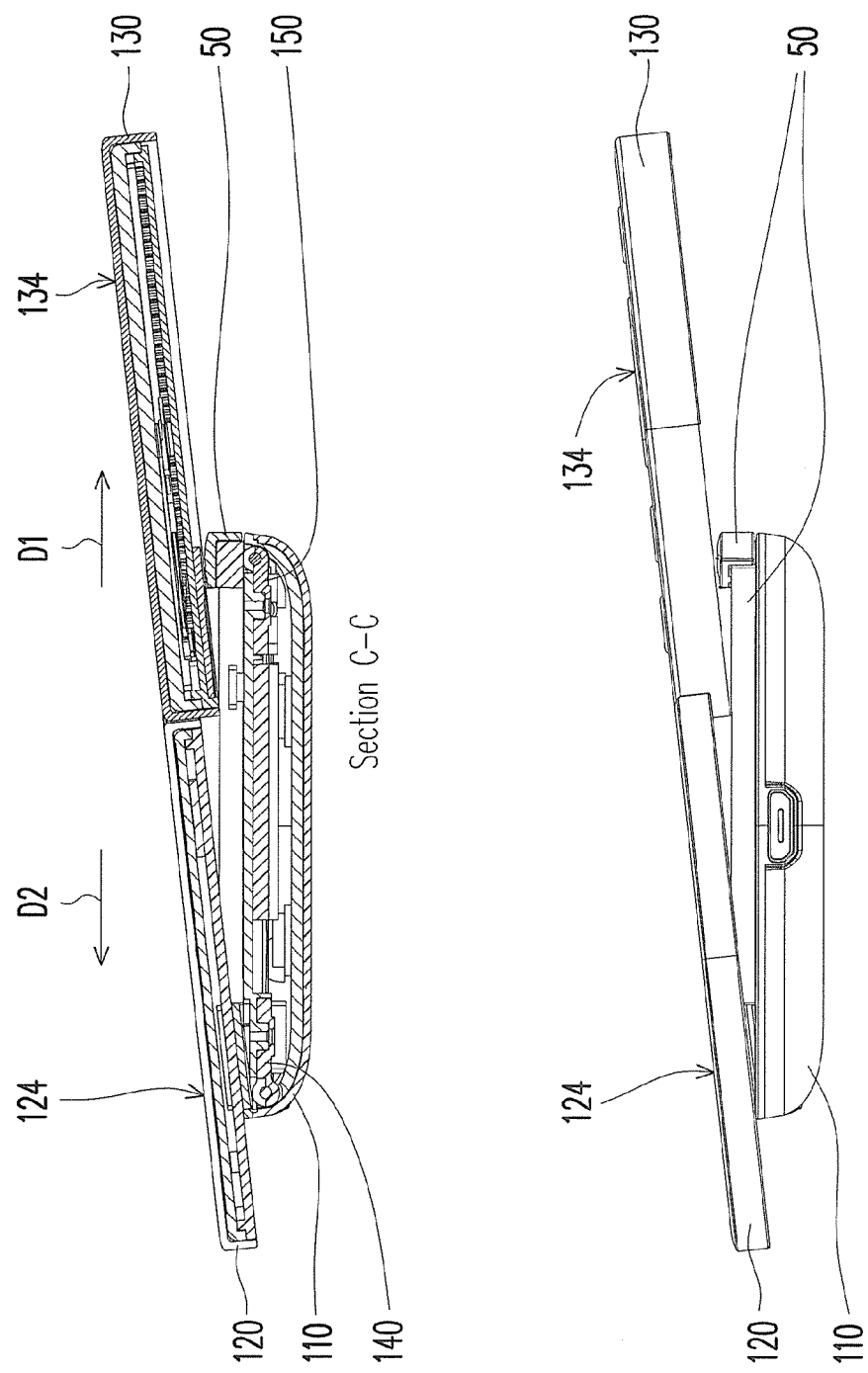
FIG. 2C is a schematic side view and a schematic cross-sectional view along section C-C of the handheld electronic device in FIG. 1C.
Figure 3A:
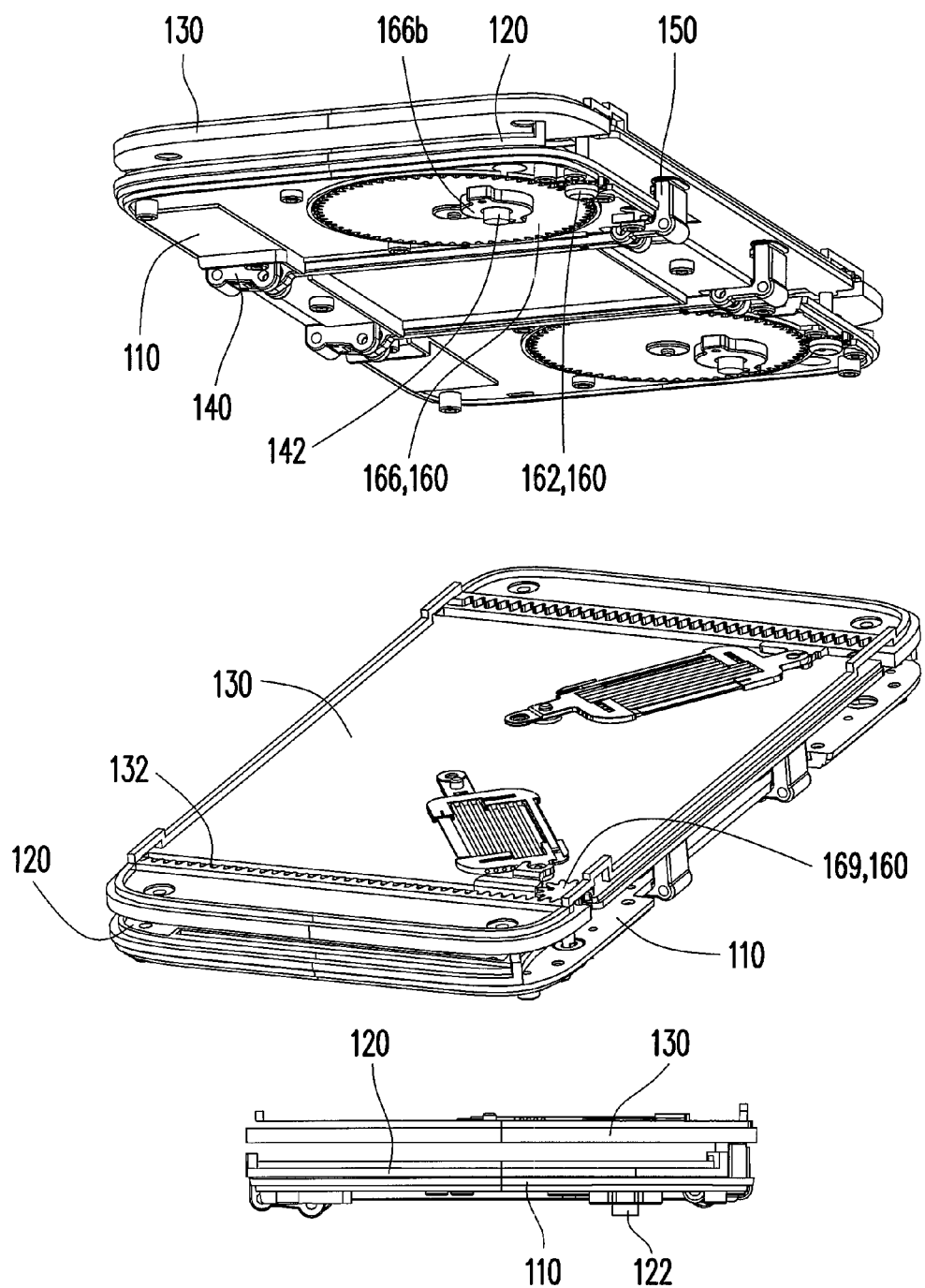
FIGS. 3A to 3C are schematic views showing part of the components of the handheld electronic device in FIGS. 1A to 1C, respectively.
Figure 3B:
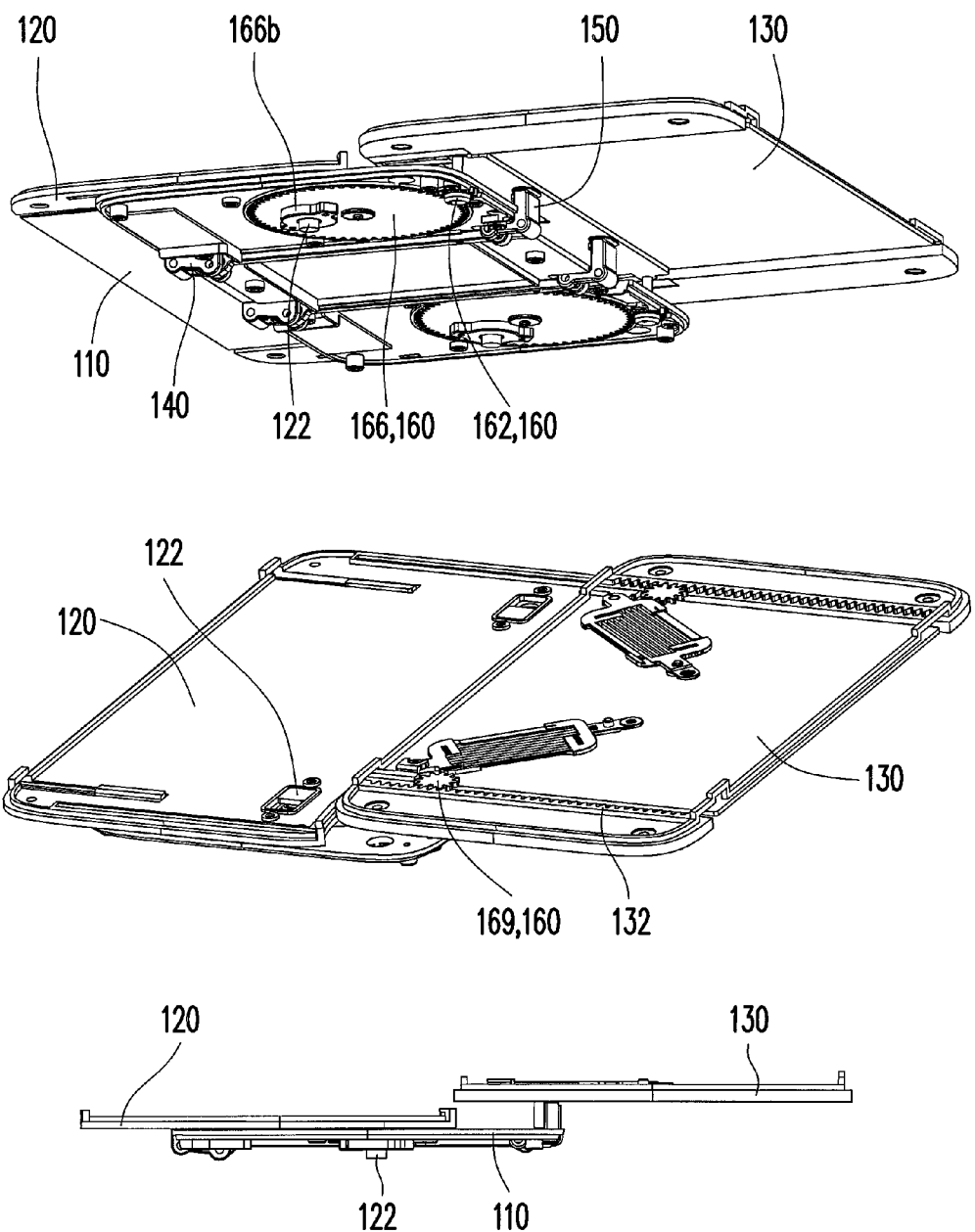
Figure 3C:
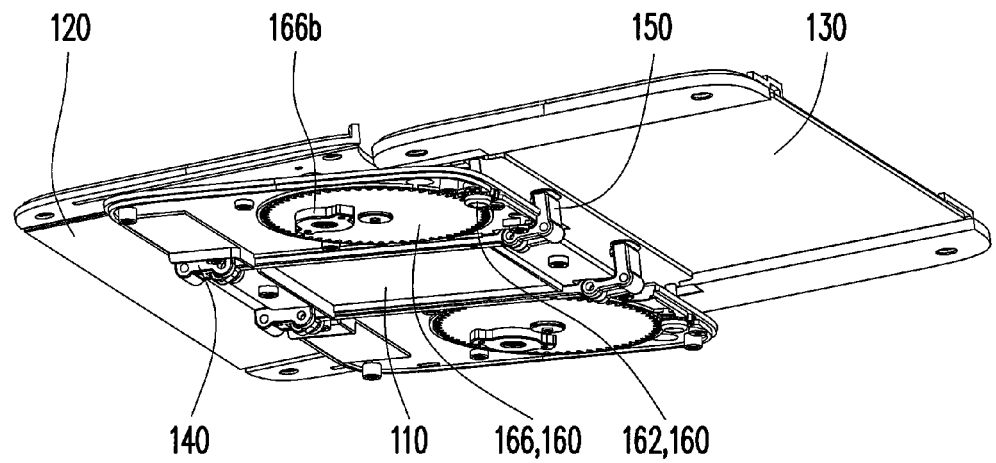
Figure 3C:
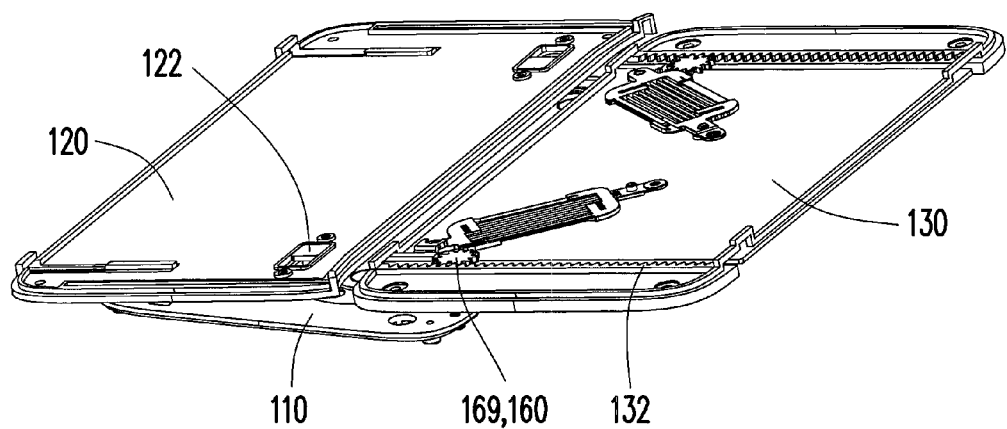
Figure 3C:
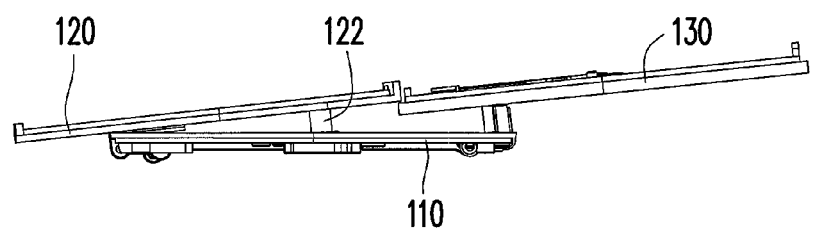
Figure 4:
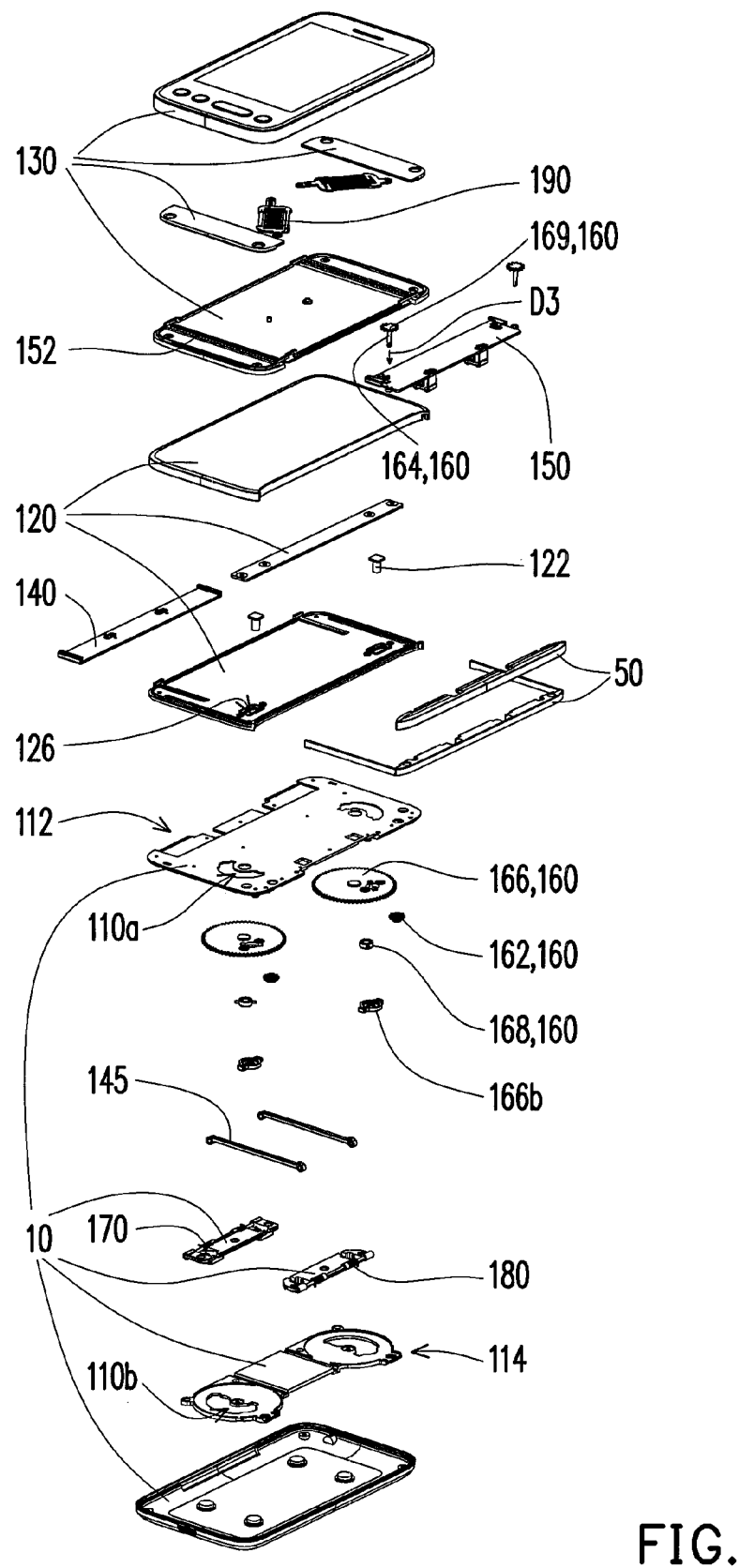
FIG. 4 is an exploded view of the handheld electronic device of FIG. 1.

FIGS. 1A through 1C schematically show operation processes of the handheld electronic device according to one embodiment of the invention. FIG. 2A is a schematic side view and a schematic cross-sectional view along section A-A of the handheld electronic device in FIG. 1A. FIG. 2B is a schematic side view and a schematic cross-sectional view along section B-B of the handheld electronic device in FIG. 1B. FIG. 2C is a schematic side view and a schematic cross-sectional view along section C-C of the handheld electronic device in FIG. 1C. FIGS. 3A to 3C are schematic views showing part of the components of the handheld electronic device in FIGS. 1A to 1C, respectively. FIG. 4 is an exploded view of the handheld electronic device of FIG. 1.

Referring to FIG. 1A, FIG. 2A, FIG. 3A, and FIG. 4, the handheld electronic device 100 of the embodiment includes a first body 110, a second body 120, a third body 130, a first pivot member 140, a second pivot member 150, and a gear set 160 (shown as two sets). The first pivot member 140 pivots to the first body 110. The second pivot member 150 pivots to the first body 110. The second body 120 having a pillar 122 (shown as a pair) is slidably disposed on the first pivot member 140. The third body 130 having a rack 132 (shown as a pair) is slidably disposed on the second pivot member 150. The second body 120 is stacked between the first body 110 and the third body 130, so the handheld electronic device 100 is in a retracted state. The gear set 160 is disposed on the first body 110 and coupled with the pillar 122 and the rack 132.

The user can push the third body 130 to move relatively to the first body 110 along the first operation direction D1. By utilizing the rack 132 to drive the gear set 160 to actuation, the second body 120 is driven by the gear set 160 via the pillar 122, to move relatively to the first body 110 along the second operation direction D2 opposite to the first operation direction D1. The positions shown in FIG. 1A, FIG. 2A, and FIG. 3A shift to the positions shown in FIG. 1B, FIG. 2B, and FIG. 3B, causing the second body 120 to be exposed by the third body 130.

When the second body 120 is exposed by the third body 130, the second body 120 and the third body 130 utilize the relative pivoting of the first pivot member 140 and the second pivot member 150 to the first body 110, to shift the positions shown in FIG. 1B, FIG. 2B, and FIG. 3B to the positions shown in FIG. 1C, FIG. 2C, and FIG. 3C. In this, the second body 120 and the third body 130 tilt relatively to the first body 110, so the handheld electronic device is in an expanded state. Thus, a display surface 124 of the second body 120 and a display surface 134 of the third body 130 combine, providing the user with a larger display operation interface.

In detail, when the third body 130, as shown in FIG. 1C and FIG. 2C, tilts relatively to the first body 110, the top surface of the third body 130, for example, combines with the top surface of the second body 120, to form a continuous surface. In this manner, the display surface 134 and the display surface 124 are adapted to respectively display two interacting screens, respectively display two identical screens, or the two surfaces together display a full screen.

Please refer to FIG. 4. In the embodiment, the handheld electronic device 100 further comprises an elastic member 170 (shown as a pair) and an elastic member 180 (shown as a pair). The elastic member 170 is connected between the first body 110 and the first pivot member 140. The elastic member 180 is connected between the first body 110 and the second pivot member 150. When the second body 120, as shown in FIG. 1B and FIG. 2B, is exposed by the third body 130, the first pivot member 140 and the second pivot member 150 can respectively utilize the elastic force in the elastic member 170 and in the elastic member 180 to pivot relatively to the first body 110, and respectively drive the second body 120 and the third body 130 to tilt relatively to the first body 110 (shown in FIG. 1C and FIG. 2C).

According to the embodiment, the elastic member 170 and the elastic member 180 can be, for example, torsion springs. When the elastic member 170 is in the position shown in FIG. 2A and FIG. 2B, it receives a force between the first pivot member 140 and the first body 110, and so possesses elastic potential energy. When the elastic member 180 is in the position shown in FIG. 2A and FIG. 2B, it receives a force between the second pivot member 150 and the first body 110, and so possesses elastic potential energy. When the elastic member 170 and the elastic member 180 are in the position shown in FIG. 2C, due to the first pivot member 140 and the second pivot member 150 both obtaining flexibility in the relative pivoting to the first body 110, the elastic potential energy in the elastic member 170 and the elastic member 180 is released. Relying on the elastic force, it respectively drives the first pivot member 140 and the second pivot member 150 to pivot relatively to the first body 110, and then respectively drives the second body 120 and the third body 130 to tilt towards the first body 110.

In addition, please refer to FIG. 4. In the embodiment, the handheld electronic device 100 further includes an elastic member 190 (shown as a pair). The elastic member 190 is connected between the third body 130 and the second pivot member 150. It is adapted to either store elastic potential energy or release elastic potential energy during the process of when the third body 130 moves relatively to the first body 110. This way, when the handheld electronic device 100 is opening, it provides the energy required for the third body 130 to move relatively to the first body 110, giving the user for pushing the third body 130 in an easier manner.

The elastic device 190 of the embodiment is, for example, a helical spring or a coil spring (shown as a helical spring). It is used so the handheld electronic device 100 is adapted to provide a semi-auto sliding function. In detail, during the process of the third body 130 moving relatively to the first body 110, from the position in FIG. 2A to the position in FIG. 2B, the user needs to first confront the elastic force of the elastic member 190 to push the third body 130 to a critical point. Next, the elastic member 190 starts to release elastic potential energy, and uses the elastic force to drive the third body 130 to automatically move to the position shown in FIG. 2B. Similarly, during the process of the third body 130 moving relatively to the first body 110, from the position in FIG. 2B to the position in FIG. 2A, the user needs to first confront the elastic force of the elastic member 190 to push the third body 130 to a critical point. Next, the elastic member 190 starts to release elastic potential energy, and uses the elastic force to drive the third body 130 to automatically move to the position shown in FIG. 2A.

Figure 5A:
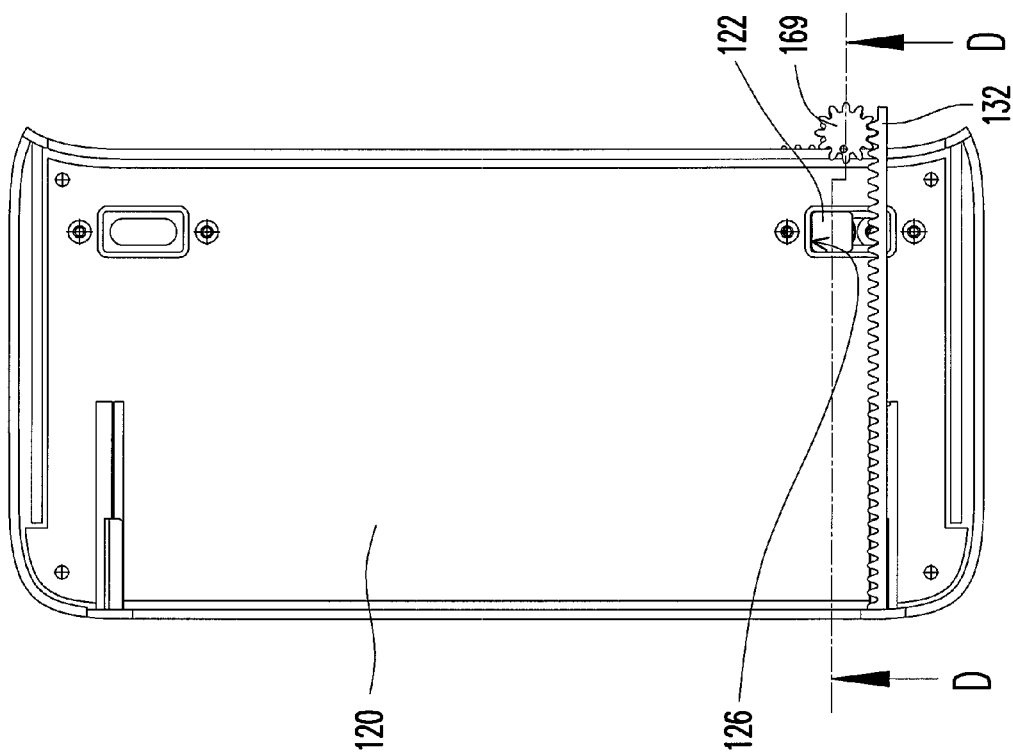
Figure 5B:
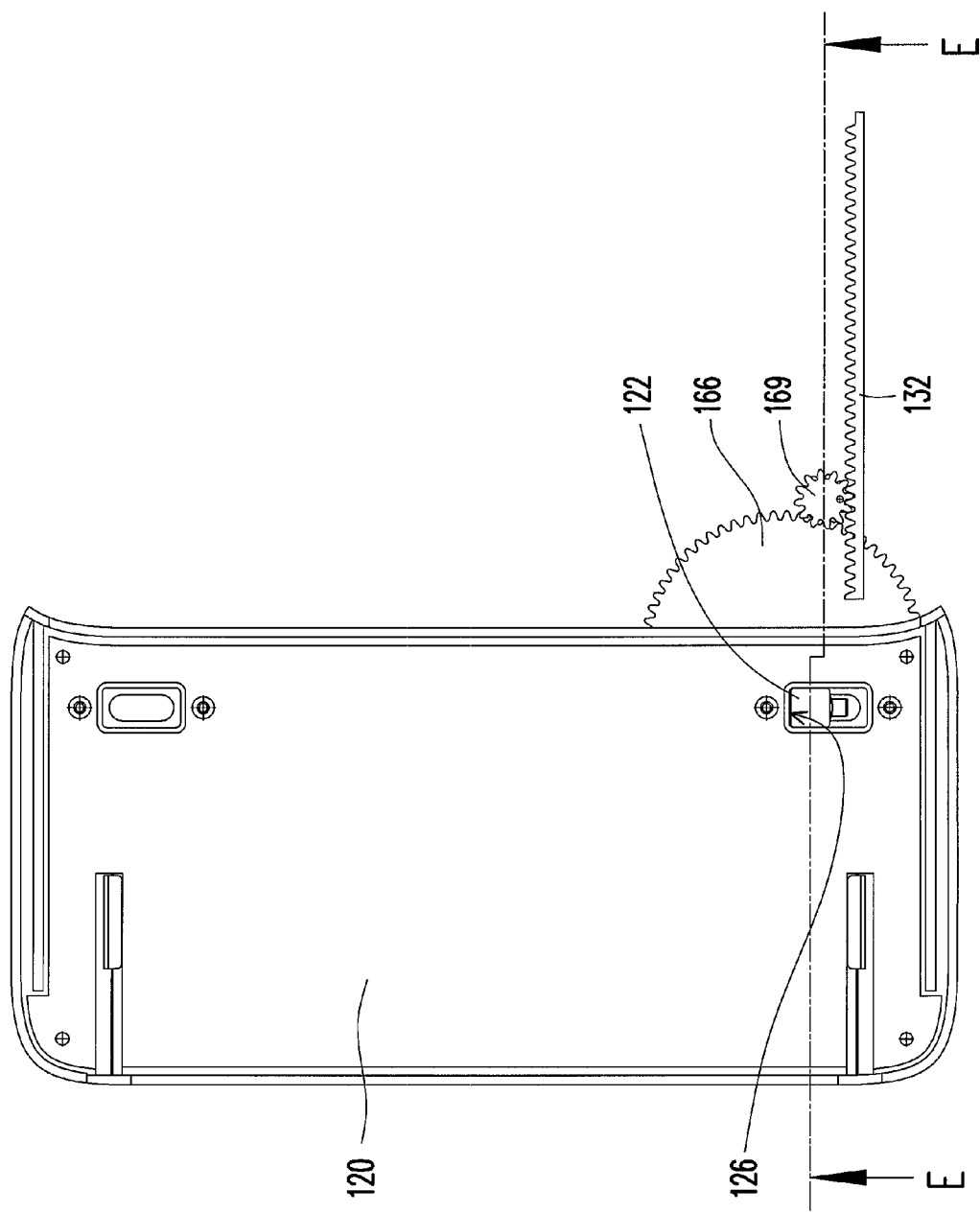
Figure 6A:
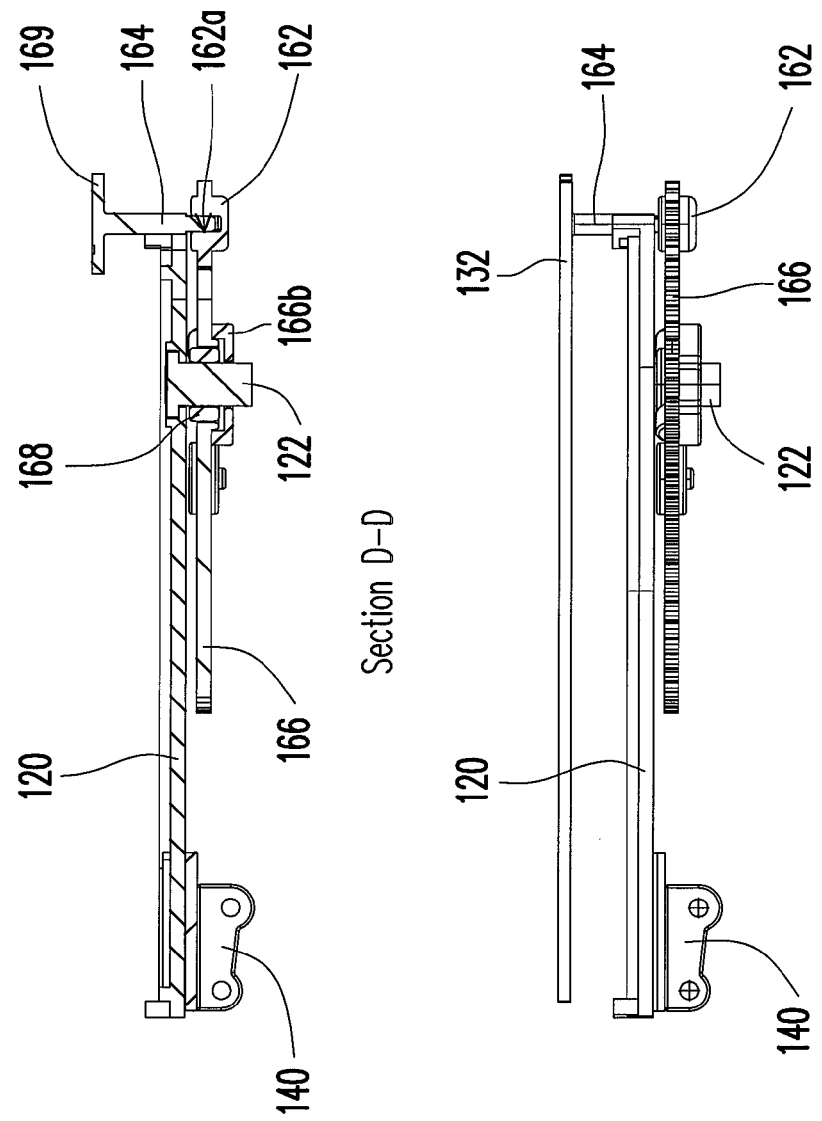
FIG. 6A is a schematic side view and a schematic cross-sectional view along section D-D of the handheld electronic device in FIG. 5A.
Figure 7A:
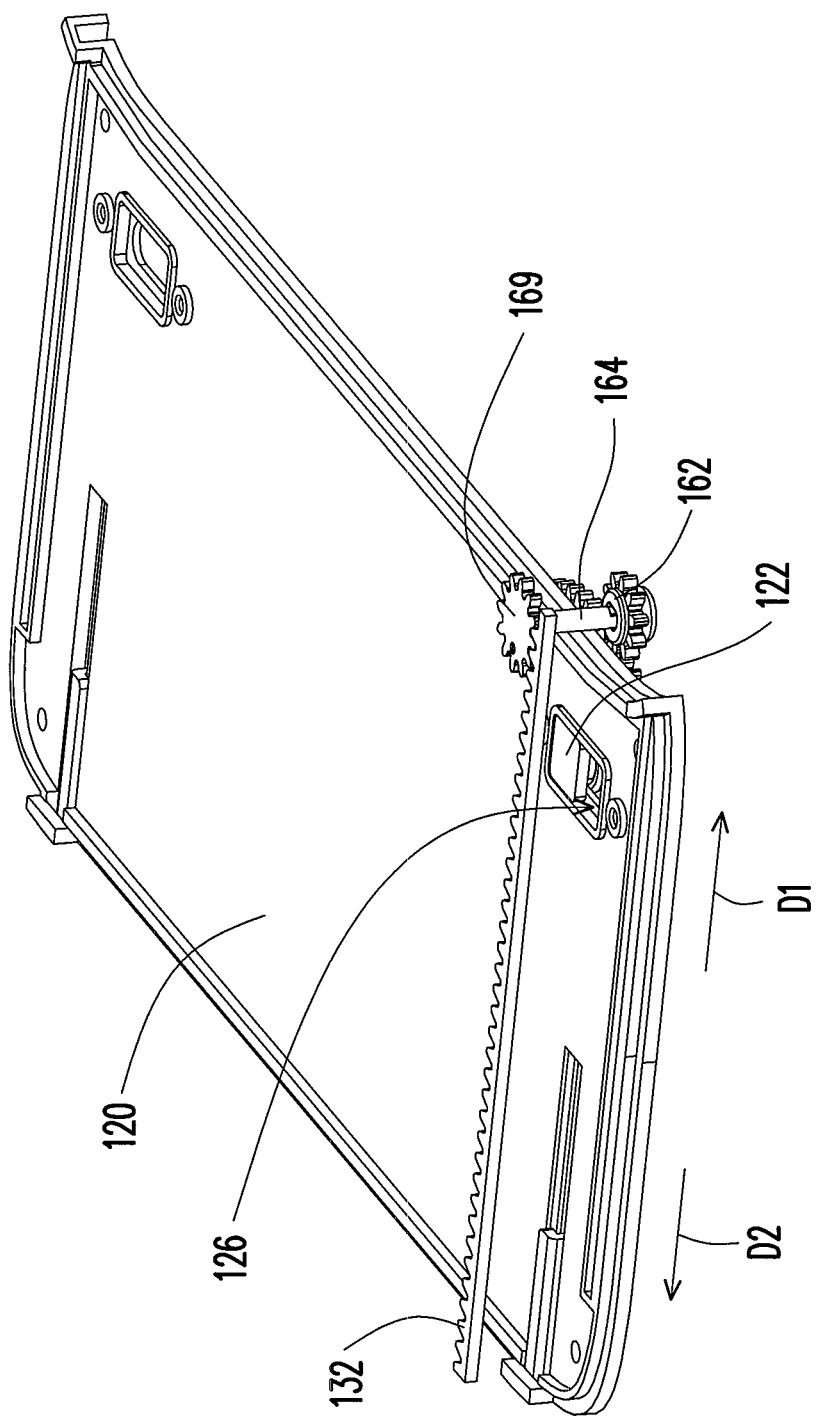
FIGS. 7A to 7C are schematic three-dimensional diagrams of the handheld electronic device in FIGS. 5A to 5C, respectively.
Figure 7B:
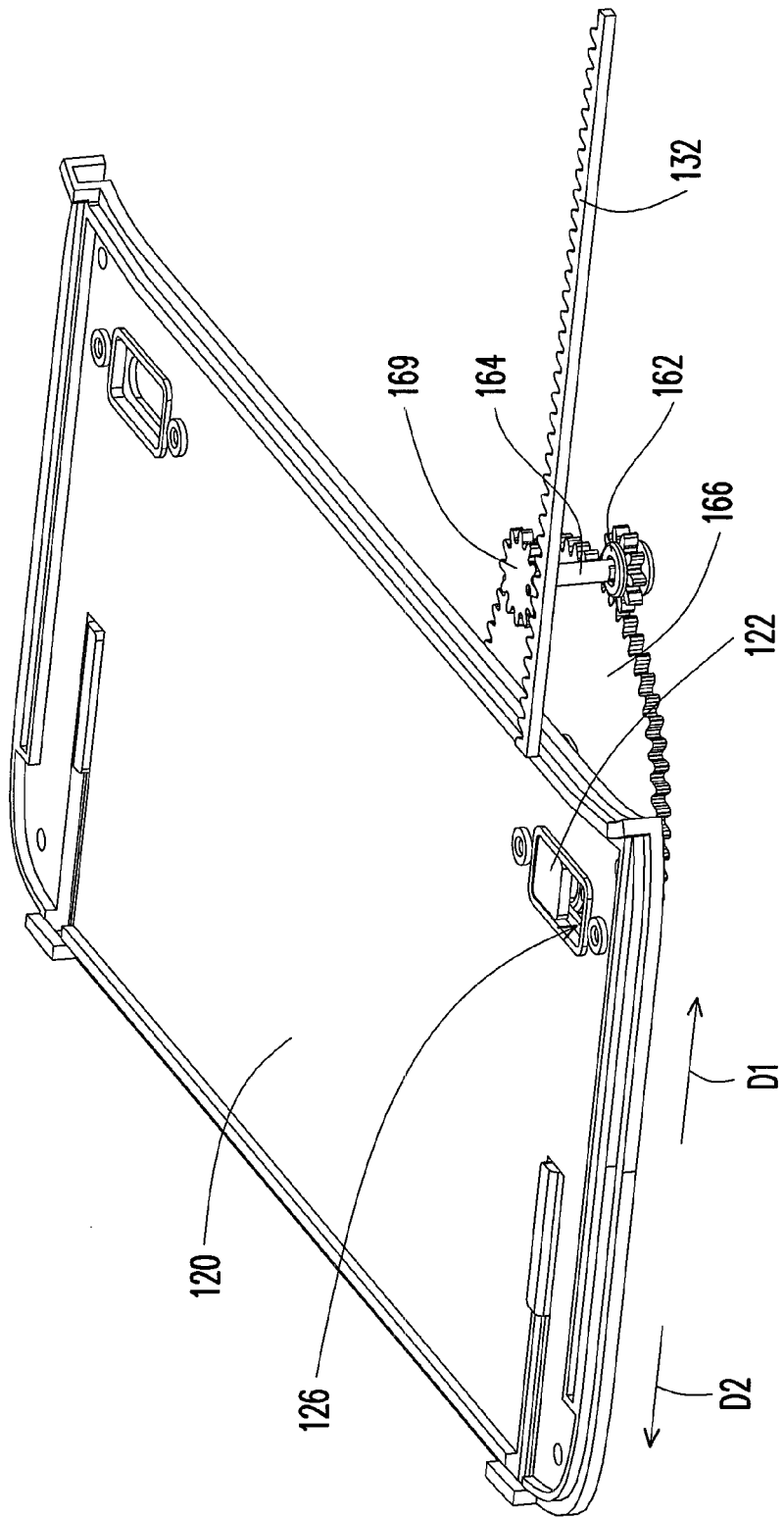
Figure 7C:
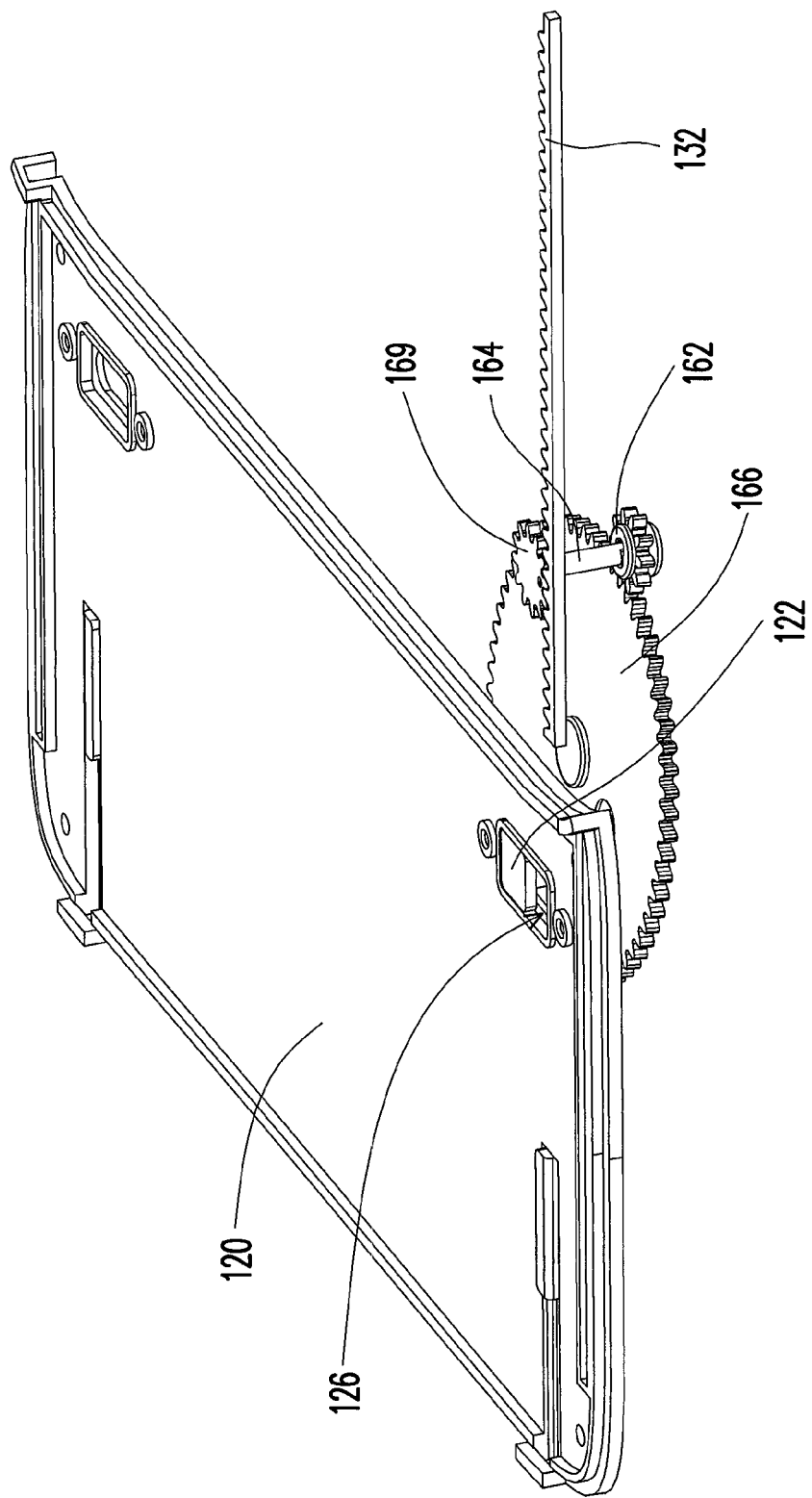
Figure 8A:
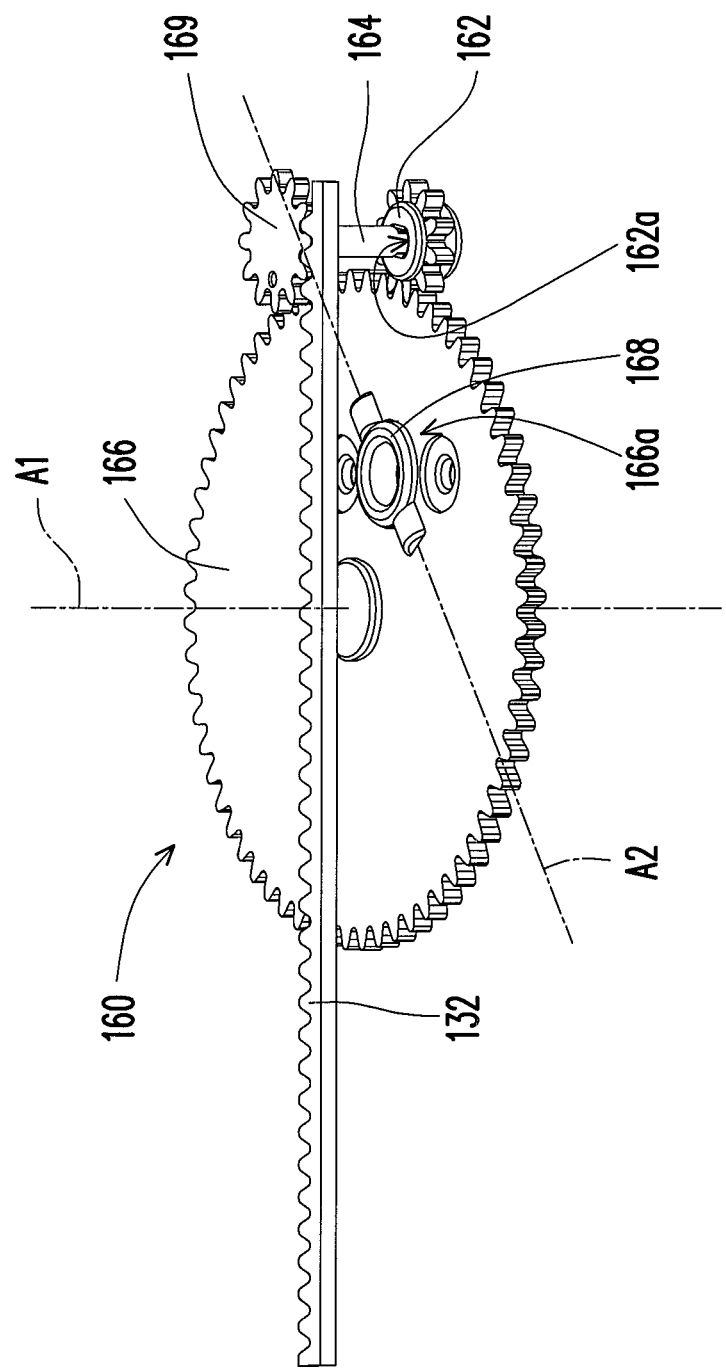
FIGS. 8A to 8C are schematic three-dimensional diagrams of the gear set in FIGS. 5A to 5C, respectively.
Figure 8B:
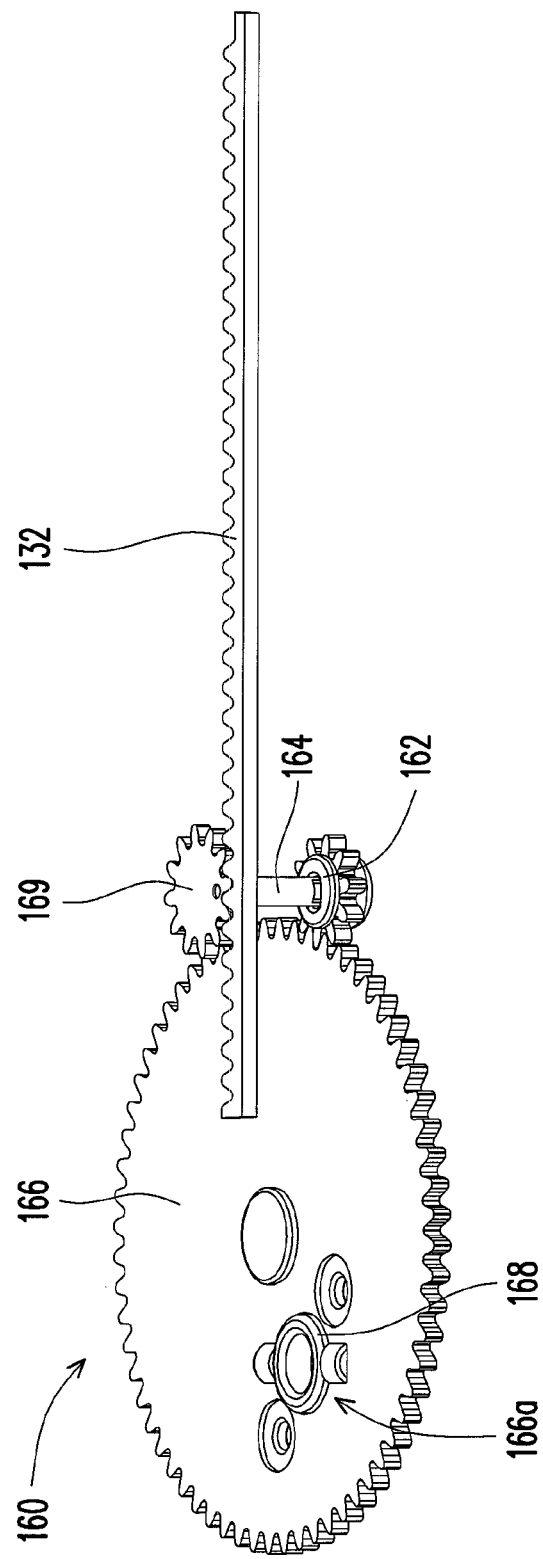
Figure 8C:
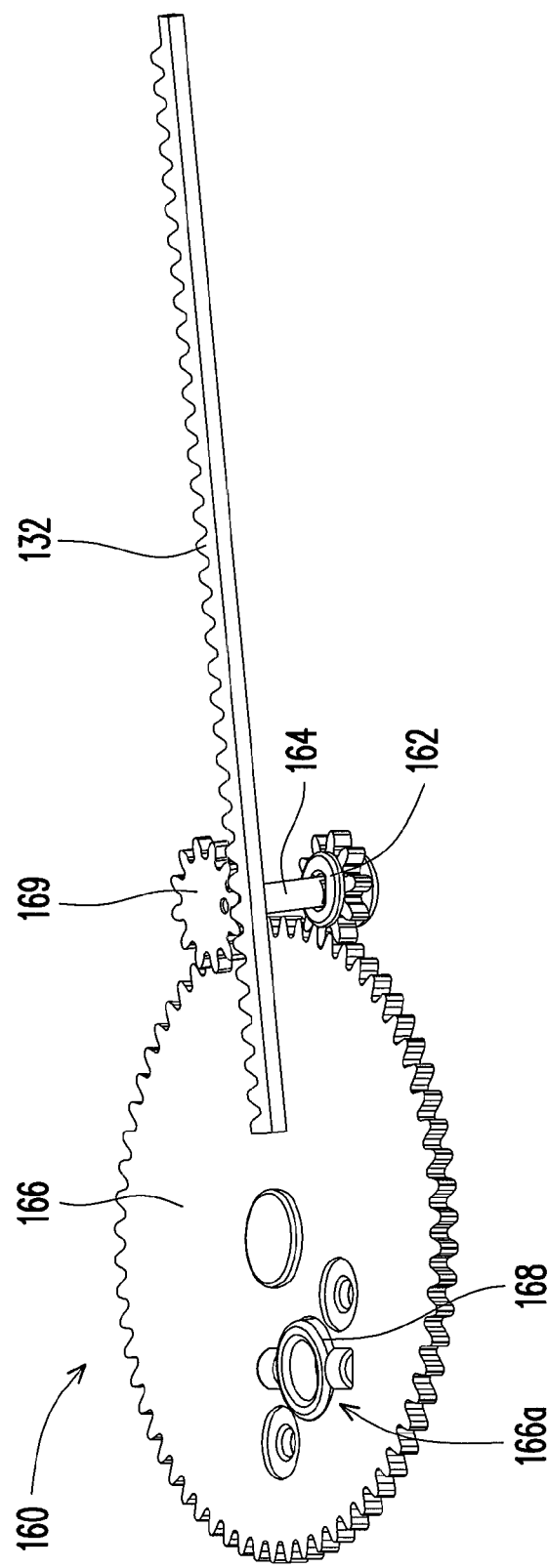

FIGS. 5A to 5C are schematic views showing part of the components and the operation processes of the handheld electronic device in FIGS. 1A to 1C, respectively. FIG. 6A is a schematic side view and a schematic cross-sectional view along section D-D of the handheld electronic device in FIG. 5A. FIG. 6B is a schematic side view and a schematic cross-sectional view along section E-E of the handheld electronic device in FIG. 5B. FIG. 6C is a schematic side view and a schematic cross-sectional view along section F-F of the handheld electronic device in FIG. 5C. FIGS. 7A to 7C are schematic three-dimensional diagrams of the handheld electronic device in FIGS. 5A to 5C, respectively. FIGS. 8A to 8C are schematic three-dimensional diagrams of the gear set in FIGS. 5A to 5C, respectively.

Please refer to FIG. 5A, FIG. 6A, FIG. 7A, and FIG. 8A. In detail, the gear set 160 of the embodiment includes a first driven gear 162, a tilt shaft 164, a second driven gear 166, a sleeve 168, and a drive gear 169. The first driven gear 162 having an opening slot 162a is coupled with the second driven gear 166. An end of the tilt shaft 164 is able to swing in the opening slot 162a. The sleeve 168 is pivoted to a pivot portion 166a of the second driven gear 166 along a pivot shaft A2 (shown in FIG. 8A) substantially perpendicular to a rotation axis A1 (shown in FIG. 8A) of the second driven gear 166, wherein the pivot portion 166a is ascentric from the rotation axis A1 of the second driven gear 166. The sleeve 168 with capability of rotation is implemented on an end of the pillar 122 (as shown in FIG. 6A). When the second driven gear 166 rotates, the pillar 122 and the sleeve 168 rotate relatively. The drive gear 169 is coupled with the rack 132 and fixed to another end of the tilt shaft 164, utilizing the tilt shaft 164 to drive rotation in the first driven gear 162.

By this implementation manner, the rack 132 moves with the third body 130 (shown in FIG. 3A). And, by using the drive gear 169 and the first driven gear 162 to drive the second driven gear 166 from the positions shown in FIG. 5A, FIG. 6A, FIG. 7A, and FIG. 8A to shift to the positions shown in FIG. 5B, FIG. 6B, FIG. 7B, and FIG. 8B, the second body 120 is exposed by the third body 130 (shown in FIG. 3B). Meanwhile, the second body 120 and the third body 130 tilt relatively to the first body 110 as shown in FIG. 3C.

When the third body 130 tilts relatively to the first body 110, the tilt shaft 164 is able to swing along the opening slot 162a (shown in FIG. 6C), so that the whole structure can successfully actuate. In the embodiment, the tilt shaft 164 is furthermore disposed by passing through the second pivot member 150 along a direction D3 (labeled in FIG. 4), so that the second pivot member 150 is adapted to drive the tilt shaft 164 to swing along the opening slot 162a by utilizing its relative pivoting to the first body 110. In addition, when the second body 120 tilts relatively to the first body 110 (as shown in FIG. 3C), the pillar 122 drives the sleeve 168 to pivot relatively to the second driven gear 166 (as shown in FIG. 6C), so that the whole structure can successfully actuate.

Please refer to FIG. 4. In the embodiment, a restraint member 166b is used to fix the bottom surface of the second drive gear, and so when the pillar 122 is actuating between the position shown in FIG. 6A and the position shown in FIG. 6B, the bottom ends of the restraint member 166b and the pillar 122 generate structural interference, so that the second driven gear 166 can successfully drive the pillar 122. In addition, the first body 110 includes a plate 112 and a plate 114. The plate 112 and the plate 114 respectively have an opening slot 110a and an opening slot 110b, to provide the pillar 122 with the necessary space to move relative to the first body 110.

Please refer to FIG. 7A and FIG. 7B. In the embodiment, the second body 120 has a sliding slot 126. The extension direction of the sliding slot 126 is substantially perpendicular to the first operation direction D1, and an end of the pillar 122 is slidably disposed in the sliding slot 126. When the second driven gear 166 rotates, the pillar 122 moves along the sliding slot 126, and drives the second body 120 to move relatively to the first body 110 along the first operation direction D1 or the second operation direction D2, so that the whole structure can successfully actuate.

Please refer to FIG. 4. In the embodiment, the handheld electronic device 100 further comprises a connecting shaft 145. The two ends of the connecting shaft 145 respectively pivot to the first pivot member 140 and the second pivot member 150. This way, the first body 110, the connecting shaft 145, the first pivot member 140, and the second pivot member 150 are adapted to the operation of a four bar linkage mechanism. This ensures the connection and tilt angle between the second body 120 and the third body 130. For example, the second body 120 and the third body form a continuous surface or a flat surface after tilting, and respectively display two interacting screens, respectively display two identical screens, or the two surfaces together display a full screen.

In the embodiment, the handheld electronic device 100 further comprises a decoration plate 50. The decoration plate 50 is disposed on the edge of the first body 110 and located between the first body 110 and the third body 130. Under the positions shown in FIG. 2A through FIG. 2C, the decoration plate 50 covers the first pivot member 140, the second pivot member 150, and the gear set 160, maintaining the aesthetics of the handheld electronic device 100.

In summary, the second body of the application is stacked between the first and third bodies. The third body utilizes the gear set to drive the second body. This way, the third body and the second body move along opposite directions so that the second body is exposed by the third body. Next, the second body and the third body tilt relatively to the first body, combining the third body and the second body, so that the handheld electronic device has a larger usable surface. In addition, the elastic member disposed between the first pivot member and the first body, and the elastic member disposed between the second pivot member and the first body, provides an elastic force to drive the first pivot member and the second pivot member to pivot relatively to the first body. Furthermore, the elastic member disposed between the second pivot member and the third body, provides an elastic force to drive the third body to move relatively to the first body, enhancing the operation convenience of the handheld electronic device.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A handheld electronic device, comprising:
a first body;
a first pivot member, pivoting to the first body;
a second pivot member, pivoting to the first body;
a second body, having a pillar, slidably disposed on the first pivot member;
a third body, having a rack, slidably disposed on the second pivot member, wherein the second body is stacked between the first body and the third body, so the handheld electronic device is in a retracted state; and
a gear set, disposed on the first body and coupled with the pillar and the rack, wherein when the third body moves relatively to the first body along a first operation direction, and when the rack drives the gear set to actuation, the second body is driven by the gear set via the pillar, to move relatively to the first body along a second operation direction opposite to the first operation direction to be exposed by the third body, when the second body is exposed by the third body, the second body utilizes a relative pivoting between the first pivot member and the first body to tilt relatively to the first body, and the third body utilizes a relative pivoting between the second pivot member and the first body to tilt relatively to the first body, so the handheld electronic device is in an expanded state.

2. The handheld electronic device as claimed in claim 1, wherein when the handheld electronic device is in the expanded state, a top surface of the third body and a top surface of the second body together form a continuous surface.

3. The handheld electronic device as claimed in claim 2, wherein the second body has a first display surface, the third body has a second display surface, and when the handheld electronic device is in the expanded state, the first display surface and the second display surface are adapted to respectively display two interacting screens, respectively display two identical screens, or the two surfaces together display a full screen.

4. The handheld electronic device as claimed in claim 1, further comprising an elastic member, connected between the first body and the first pivot member, when the second body is exposed by the third body, the first pivot member utilizes an elastic force of the elastic member to relatively pivot to the first body, so as to drive the second body to tilt relative to the first body.

5. The handheld electronic device as claimed in claim 4, wherein the elastic member is a torsion spring.

6. The handheld electronic device as claimed in claim 1, further comprising an elastic member, connected between the first body and the second pivot member, when the second body is exposed by the third body, the second pivot member utilizes an elastic force of the elastic member to pivot relatively to the first body, so as to drive the third body to tilt relative to the first body.

7. The handheld electronic device as claimed in claim 6, wherein the elastic member is a torsion spring.

8. The handheld electronic device as claimed in claim 1, further comprising an elastic member, connected between the third body and the second pivot member, wherein during an operation of the third body in moving relatively to the first body, the elastic member either stores elastic potential energy or releases elastic potential energy.

9. The handheld electronic device as claimed in claim 8, wherein the elastic member is a helical spring or a coil spring.

10. The handheld electronic device as claimed in claim 1, wherein the gear set comprises:
   a first driven gear, having an opening slot;
   a tilt shaft, an end of the tilt shaft capable of swing in the opening slot;
   a second driven gear, coupled with the first driven gear;
   a sleeve, pivoted to a pivot portion of the second driven gear along a pivot shaft substantially perpendicular to a rotation axis of the second driven gear, wherein the sleeve is rotatably implemented on an end of the pillar, the pivot portion is ascentric from the rotation axis of the second driven gear, and when the second driven gear rotates, the pillar and the sleeve rotate relatively; and
   a drive gear, coupled with the rack and fixed to another end of the tilt shaft, utilizing the tilt shaft to drive in rotation of the first driven gear and the second driven gear, when the second body tilts relatively to the first body, the pillar drives the sleeve to pivot relatively to the second driven gear, when the third body tilts relatively to the first body, the tilt shaft swings along the opening slot.

11. The handheld electronic device as claimed in claim 10, wherein the second body comprises a sliding slot, an extension direction of the sliding slot is substantially perpendicular to the first operation direction, an end of the pillar is slidably disposed in the sliding slot, when the second driven gear rotates, the pillar moves along the sliding slot and drives the second body to move relatively to the first body along the first operation direction or the second operation direction.

12. The handheld electronic device as claimed in claim 10, wherein the tilt shaft passes through the second pivot member, the second pivot member pivots relatively to the first body, and drives the tilt shaft to swing along the opening slot.

13. The handheld electronic device as claimed in claim 1, further comprising a connecting shaft, wherein two ends of the connecting shaft respectively pivot to the first pivot member and the second pivot member, so the first body, the connecting shaft, the first pivot member, and the second pivot member are adapted to an operation of a four bar linkage mechanism.

14. The handheld electronic device as claimed in claim 1, further comprising a decoration plate, disposed on the edge of the first body and located between the first body and the third body, to cover the gear set, the first pivot member, and the second pivot member.

* * * * *